(No Model.)

J. A. JOYCE.
COAL OR ORE BUCKET.

No. 603,143. Patented Apr. 26, 1898.

WITNESSES:
a. e. Russ
Theo. Hively

Jas. A. Joyce INVENTOR,
BY
J. W. Joyce ATTORNEY.

THE NORRIS PETERS CO., PHOTO-LITHO., WASHINGTON, D. C.

UNITED STATES PATENT OFFICE.

JAMES A. JOYCE, OF CLEVELAND, OHIO.

COAL OR ORE BUCKET.

SPECIFICATION forming part of Letters Patent No. 603,143, dated April 26, 1898.

Application filed September 2, 1897. Serial No. 650,346. (No model.)

*To all whom it may concern:*

Be it known that I, JAMES A. JOYCE, a citizen of the United States, residing at Cleveland, in the county of Cuyahoga and State of Ohio, have invented a new and useful Coal or Ore Bucket, of which the following is a specification.

My invention relates to improvements in coal or ore buckets.

The bucket is so constructed that by moving certain screws in connection with certain links the bucket is made to close with a scraping and cutting motion. The path of the transverse scraping and cutting edge very closely resembles that of an ellipse. I attain this by the mechanism illustrated in the accompanying drawings, in which—

Figure 1:
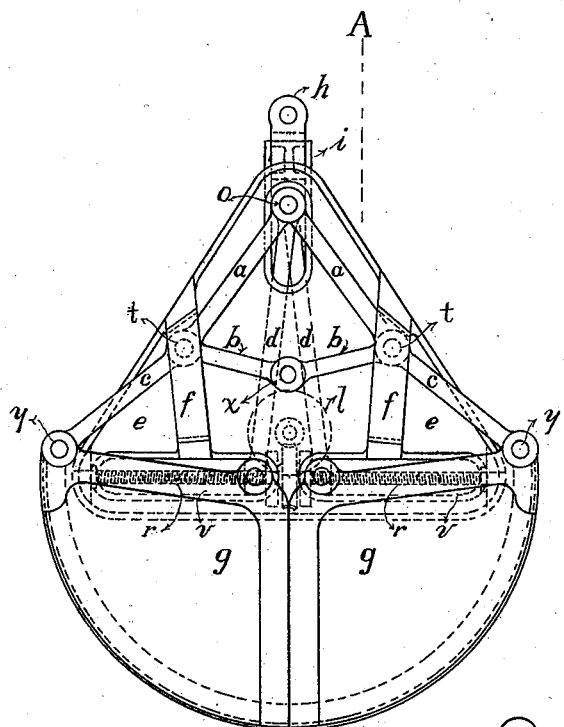
Figure 2:
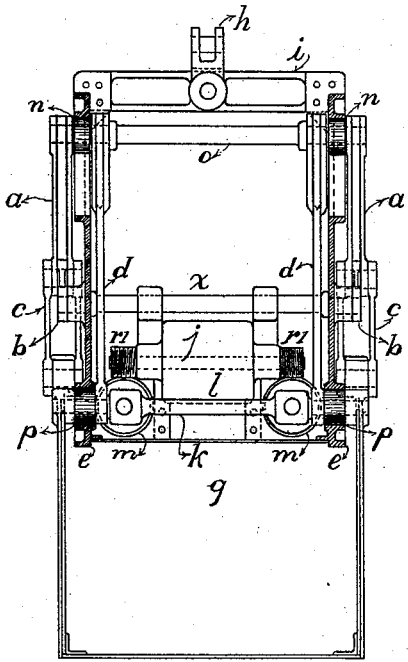
Figure 3:
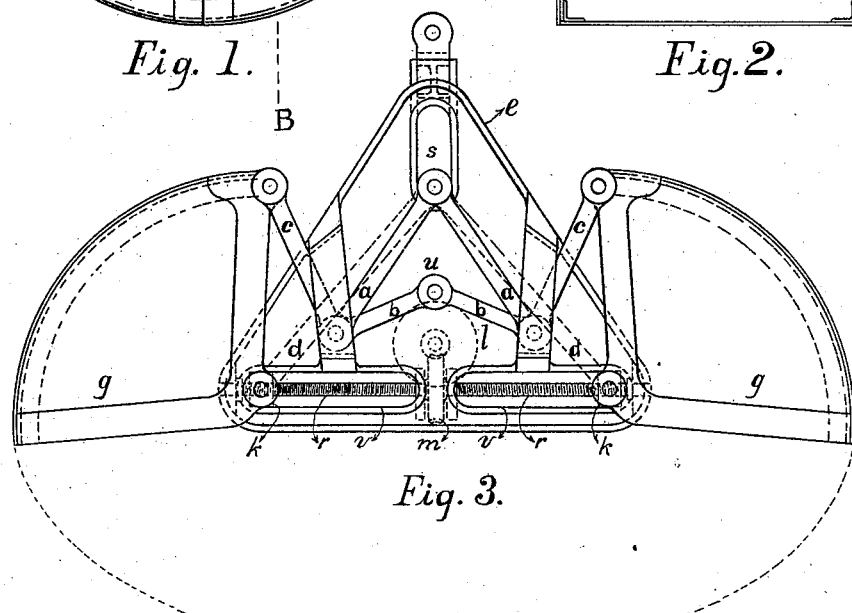

Figure 1 is a side elevation showing the bucket closed. Fig. 2 is a sectional view on line A B. Fig. 3 is a side elevation showing bucket open and the path which the transverse scraping and cutting edge passes in closing.

The bucket, briefly described, is as follows:

*h* is the part by which the bucket is hoisted and conveyed.

*i* is the cross-arm, connecting the parts *e* at the upper end forming the frame.

Parts marked *f* are guides for links to prevent any side swaying and are shown on Fig. 1 only.

Parts *g*, Figs. 1, 2, and 3, are the halves of the bucket, which has sides and curved bottom, as shown.

Part *l*, Figs. 1, 2, and 3, is an electric motor or other motive power which has a horizontal shaft provided with a worm *r'* at each end, which engages worm-wheel *m*. Worm-wheel *m* is fastened to screw *r*, which is provided with thrust-bearing on the frame *e*.

Part *k*, Figs. 2 and 3, is a transverse bar provided with two enlarged parts, in which a screw-thread is cut to receive screw *r*. The bar *k* is extended out to connect to the edge of the bucket. Just inside of the bucket is a roller which travels in a horizontal slot *v* in the frame *e*. Just inside of the roller is the link *d*, which connects to bar *k* and extends to bar *o* at the upper part of frame *e*. Bar *o* connects to link *d* and has a roller *n*. Just outside of link *d*, Fig. 2, roller *n* travels in a vertical slot *s*. Bar *o* extends through frame *e* and connects links *a*. Links *a* extend from bar *o* to pin *t*. From pin *t* links *c* extend to pin *y*, which is connected to the edge of the bucket, as shown. Links *b* extend from pin *t* to bar *x*, which is fixed in the frame *e*.

When the bucket is open, as shown in Fig. 3, and it is desired to be closed, the worms *r'* at the ends of *l* are made to revolve, which will cause the worm-wheels *m* to revolve, and as the worm-wheel *m* is fastened to screw *r* the screw *r* will also revolve and cause the bars *k* to be moved toward the center and the bar *o* to be moved vertically up from the center, and by the movement of the bars *k* and *o* the system of links are made to move about the fixed point *n* and cause the bucket to cut into and scrape up the coal or ore to fill the bucket.

To empty the coal or ore, the reverse motion of motive power causes the reverse motion of screws and links and the bucket is opened and the coal or ore released.

What I claim as my invention, and desire to secure by Letters Patent, is—

1. A power-operated bucket the combination with a frame, the bucket-sections pivoted on beams *k* movable in guides in the frame, the beam *o* movable in guides in the frame, and the links *a* and *c* connecting the movable beam *o* with the bucket-sections, the links, *d*, connecting movable beams *k* and *o*, the links *b* connecting links *a* and *c* to the frame, of a power-shaft mounted in the frame, an electric motor or other motive power for driving said shaft, mechanism for raising and lowering beam, *o*, and moving beams *k* to or from the middle of the frame; substantially as described.

2. A power-operated bucket the combination with a frame, the bucket-sections pivoted on beams *k*, movable in guides in the frame, and the links *a* and *c* connecting the movable beam *o* with the bucket-sections, the links *d* connecting movable beams *k* and *o*, the links *b* connecting links *a* and *c* to the frame, of a power-shaft with right and left worm-screws *r'* at either end, mounted in the frame, and engaging worm-wheel *m* on screw-shaft *r*, an electric motor or other motive power for driving said power-shaft, substantially as described.

3. A power-operated bucket the combination with a frame, the bucket-sections pivoted on beams $k$, movable in guides in the frame, and the links $a$ and $c$ connecting the movable beam $o$ with the bucket-sections, the links $d$ connecting links $a$ and $c$ to the frame, of a pair of horizontal right and left screw-shafts $r$ mounted in the frame and engaging threaded openings in beams $k$, an electric motor or other motive power for operating same substantially as described.

JAMES A. JOYCE.

Witnesses:
A. E. RUSS,
RUD. SPONHOLZ.